(12) United States Patent  
Snowden et al.

(10) Patent No.: US 6,965,776 B2
(45) Date of Patent: Nov. 15, 2005

(54) PORTABLE COMMUNICATION DEVICE AND NETWORK AND METHODS THEREFORE

(75) Inventors: Gregory O. Snowden, Boca Raton, FL (US); John M. Burgan, North Palm Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 43 days.

(21) Appl. No.: 10/719,574

(22) Filed: Nov. 21, 2003

(65) Prior Publication Data

US 2005/0113103 A1    May 26, 2005

(51) Int. Cl.$^7$ .............................................. H04Q 7/20
(52) U.S. Cl. .............................. 455/452.1; 455/452.2; 455/522
(58) Field of Search .......................... 455/67.11, 126, 455/127.1, 423, 69, 436, 452.1, 522, 452.2; 370/342, 347, 465, 318, 320

(56) References Cited

U.S. PATENT DOCUMENTS

| | | | |
|---|---|---|---|
| 5,594,738 A * | 1/1997 | Crisler et al. ................ | 370/347 |
| 6,285,665 B1 | 9/2001 | Chuah | |
| 6,289,211 B1 * | 9/2001 | Koorapaty et al. ....... | 455/404.2 |
| 6,304,749 B1 * | 10/2001 | Obara ......................... | 455/126 |
| 6,311,070 B1 * | 10/2001 | Tong et al. .................. | 455/522 |
| 6,317,224 B1 * | 11/2001 | Lutgen et al. .............. | 358/412 |
| 6,477,160 B2 | 11/2002 | Gleeson | |
| 6,542,728 B1 * | 4/2003 | Kaku .......................... | 455/406 |
| 6,549,785 B1 * | 4/2003 | Agin ........................... | 455/522 |
| 6,587,697 B2 | 7/2003 | Terry et al. | |
| 2002/0111163 A1 * | 8/2002 | Hamabe ...................... | 455/425 |
| 2003/0050086 A1 * | 3/2003 | Lee et al. .................... | 455/522 |
| 2003/0110506 A1 * | 6/2003 | Kim ............................. | 725/95 |

* cited by examiner

Primary Examiner—Jean Gelin
(74) Attorney, Agent, or Firm—Randi L. Karpinia; Randy Vaas (57) ABSTRACT

A portable communication device (150, 170, 175, 200) is responsive to an uplink change to determine whether the uplink change is practicable (305, 405, 505). If the uplink change is determined by the device to be practicable, the uplink change will be permitted by the device. If the uplink change is determined by the device to not be practicable, alternatives are evaluated (320, 420, 520). A network (102) upon determining that a portable communication device (150, 170, 175, 200) requires an uplink power change, transmits (630) the power change request to the portable device. Responsive to the power change request, the network receives from the device a data allocation change (640) associated with said power change request. The network transmits an updated uplink channel allocation assignment if available.

19 Claims, 7 Drawing Sheets

FIG. 1

PRIOR ART

PORTABLE COMMUNICATION DEVICE AND NETWORK AND METHODS THEREFORE

BACKGROUND OF THE INVENTION

1. Field of the Invention

The present invention is related to a portable communication device and network, and more particularly to a portable communication device and network and methods of operation thereof.

2. Description of the Related Art

Cellular telephones, messaging devices, PDAs (Personal Digital Assistants) and other portable communication devices have become fixtures of everyday life over the last several years. As they evolve, the devices' capabilities and differentiation have expanded. For example, such devices can be used to make wireless connection to the Internet, play games, send and receive videos and/or still pictures, carry out electronic mail and other messaging functions, as well as send and receive voice calls. It is anticipated that as time goes by, the capabilities and variety of such devices will continue to increase. For example, In the future, portable communication devices will have the capability to simultaneously operate in multiple modes such as communicating on a voice call while transmitting a large quantity of data.

The manner in which a portable communication device is utilized affects its radiated performance, which in turn affects the quality of service provided by the device. Each device can be operated in a different manner dependent upon the current operation being performed. For example, during a voice communication, a user positions the portable communication device against his/her head, aligning the device microphone with his/her mouth to facilitate speaking into the microphone, and aligning the device earpiece to his/her ear to facilitate listening to the output signal generated by the earpiece. As another example, when using a speaker, data transfer, or other hands free operation, the portable communication device is typically located at some greater distance from the user, perhaps resting on a table at a lower elevation. Further, variations in the local environment of the portable communication device affect its radiated performance. For example, when a device is located farther away from the base station, higher output power from the device may be necessary to communicate with the base station.

Communication devices must meet regulatory and industry-mandated standards. Regulatory agencies dictate the maximum amount of radiated power that a communication device can transmit in a designated frequency band, the maximum amount of radiated emissions that are allowed outside the operational frequency band, and also the allowable limits on Specific Absorption Rates or energy deposition. Industry standards follow the regulatory standards and also dictate the minimum allowable radiated levels for a given operational frequency band. In combination, these standards for communication devices constrain both the maximum and minimum power that a communication device can transmit, the maximum out of band radiated emissions, and the maximum levels of energy deposition.

The conflict between meeting regulatory and industry standards and providing optimum quality of service for a variety of communication functions within one portable communication device provides challenges to device designers. For example, for packet data protocols such as TDMA (time division multiple access), GPRS (General Packet Radio Service) and EGPRS (Enhanced GPRS), multiple uplink slots per frame are desirable in order to support the sending of large data files. An increase in the number of slots utilized can result in a corresponding increase in average transmit power, and this in turn can result in transmit power and heat dissipation levels not meeting desired quality of service levels. Today, these challenges are typically met using communication system-wide solutions.

The prevalence and expanded utilization of portable communication devices has led to a continually expanding variety of performance characteristics and capabilities. Such characteristics include antenna efficiency, heat dissipation, battery life, and the like. Today's system-level solutions do not allow for performance and functionality of each unique device to be optimized individually for individual operational modes.

BRIEF DESCRIPTION OF THE DRAWINGS

The accompanying figures, where like reference numerals refer to identical or functionally similar elements throughout the separate views and which together with the detailed description below, are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The present invention provides a portable communication device and a network operating within a wireless communication system and associated methods of operation. The portable communication device detects a communication uplink change; determines whether said uplink change is practicable; permits the change if said uplink change is determined by the device to be practicable. The device may evaluate alternatives if said uplink change is not practicable.

Figure 1:
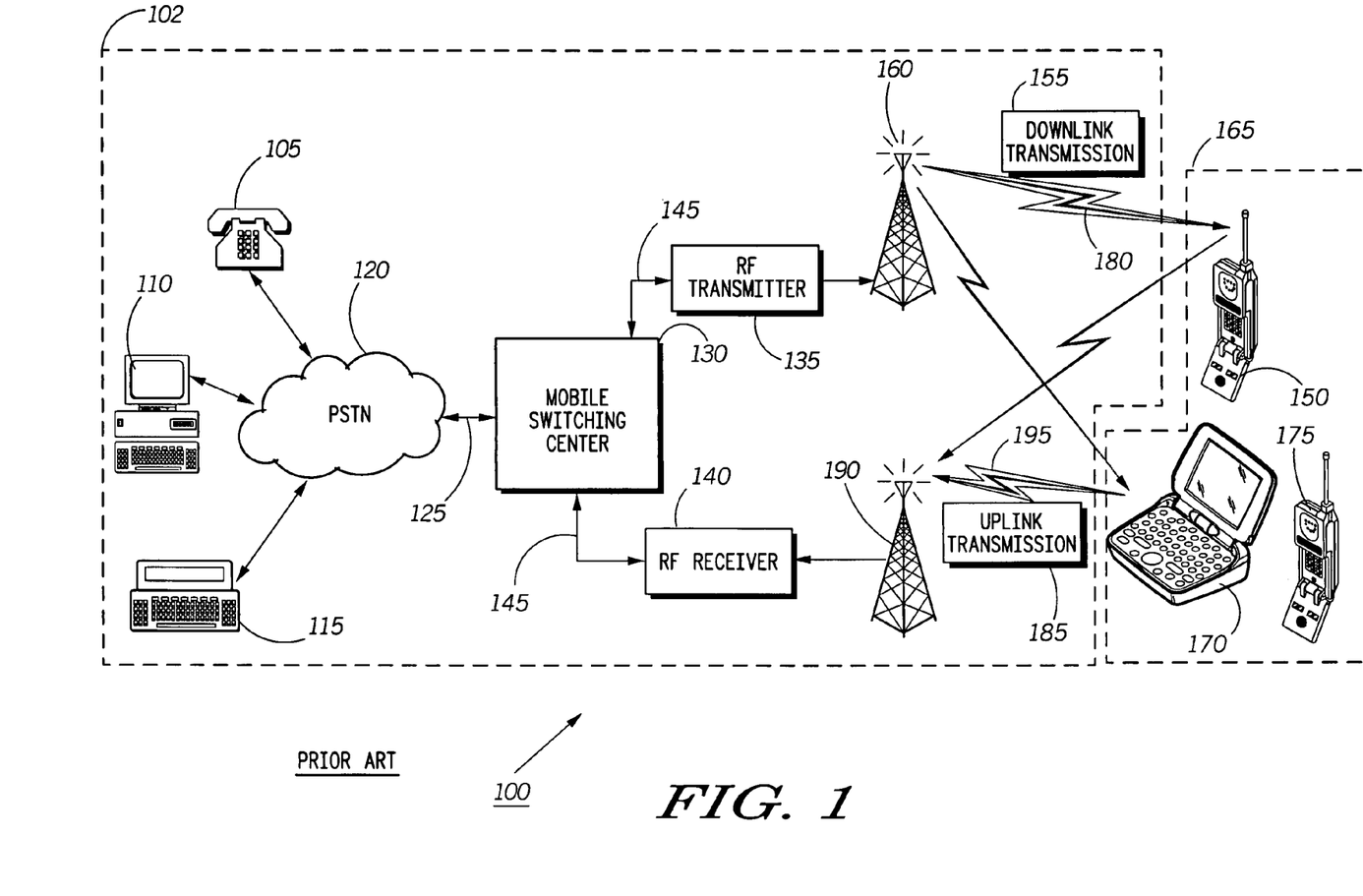
FIG. 1 is an electronic block diagram illustrating a wireless communication system.

Referring to FIG. 1, an electronic block diagram of a wireless communication system 100 is shown. The wireless communication system 100 includes a network 102 for controlling the communication of messages to, from, and among one or more portable communication devices 165. The network 102 includes a message input device for initiating messages into the network 102. The message input device can be, for example, a telephone 105, a computer 110, or a desktop messaging unit 115, connected through a conventional public switched telephone network (PSTN) 120 through one or more telephone links 125 to a Mobile Switching Center (MSC) 130. The one or more telephone links 125, for example, can be a plurality of twisted wire pairs, a fiber optic cable, or a multiplexed trunk line.

The MSC 130 is coupled to and oversees the operation of at least one radio frequency (RF) transmitter 135 and at least one radio frequency (RF) receiver 140 through one or more communication links 145. The communication links 145 typically are twisted pair telephone wires, and additionally can include radio frequency (RF), microwave, or other communication links. The radio frequency transmitter 135 and the radio frequency receiver 140 typically are used with message store and forward stations that encode and decode inbound and outbound messages into formats that are compatible with landline message switched computers and personal radio addressing requirements, such as cellular messages, short messaging service, or paging protocols. The MSC 130 can also function to encode and decode wireless messages that are transmitted to or received by the radio frequency transmitter 135 or the radio frequency receiver 140. Telephony signals are typically transmitted to and received from the MSC 130 by telephone sets such as the telephone 105 or a portable communication device 150. The MSC 130 encodes and schedules outbound messages such as a downlink transmission 155. The MSC 130 then transmits the encoded outbound messages through the radio frequency transmitter 135 via a transmit antenna 160 to one or more portable communication devices 165, such as the portable communication devices (150, 170, and/or 175), on at least communication downlink 180. The at least one communication downlink 180, for example, can be an outbound radio frequency channel. The downlink transmission 155 can be, for example, a data message or a voice call. In accordance with the present invention, each communication downlink 180 has one or more downlink allocations associated therewith. The one or more downlink allocations, for example, can include one or more timeslots in a packet data system such as a TDMA (Time Division Multiple Access) system and can include one or more codes in a CDMA (Code Division Multiple Access) system.

Similarly, the MSC 130 receives and decodes inbound messages such as an uplink transmission 185 received by the radio frequency receiver 140 via a receive antenna 190 on at least one communication uplink 195 from one of the portable communication devices 165. The communication uplink 195, for example, can be one or more inbound radio frequency (RF) channels. The uplink transmission 185 can be, for example, a data message, a reply to a data message, a voice call, or a reply to a voice call. In accordance with the present invention, each communication uplink 195 has one or more uplink allocations associated therewith. The one or more uplink allocations, for example, can include one or more timeslots in a packet data system such as a TDMA (Time Division Multiple Access) system and can include one or more codes in a CDMA (Code Division Multiple Access) system. Alternatively, the one or more uplink allocations can include a coding rate.

It will be appreciated by one of ordinary skill in the art that the wireless communication system 100, in accordance with the present invention, can operate in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-136 Time Division Multiple Access (TDMA) digital cellular system, the IS-95 Code Division Multiple Access (CDMA) digital cellular system, the CDMA 2000 system, the Wideband CDMA (W-CDMA) system, the Personal Communications System (PCS), the Third Generation (3G) system, the Universal Mobile Telecommunications System (UMTS) and variations and evolutions of these protocols. In the following description, the term "wireless communication system" refers to any of the systems mentioned above or an equivalent. Additionally, it is envisioned that wireless communication systems can include wireless local area networks, including pico-networks, or the like.

Similarly, it will be appreciated by one of ordinary skill in the art that each of the portable communication devices 165, in accordance with the present invention, can operate within any of the wireless communication systems described previously herein or an equivalent. For example, a portable communication device can be a mobile cellular telephone, a mobile radio data terminal, a mobile cellular telephone having an attached or integrated data terminal, a two-way messaging device, or an equivalent. Similarly, the communication device can be any other electronic device such as a personal digital assistant or a laptop computer having wireless communication capabilities. In the following description, the term "portable communication device" refers to any combination of the devices mentioned above or an equivalent.

Figure 2:
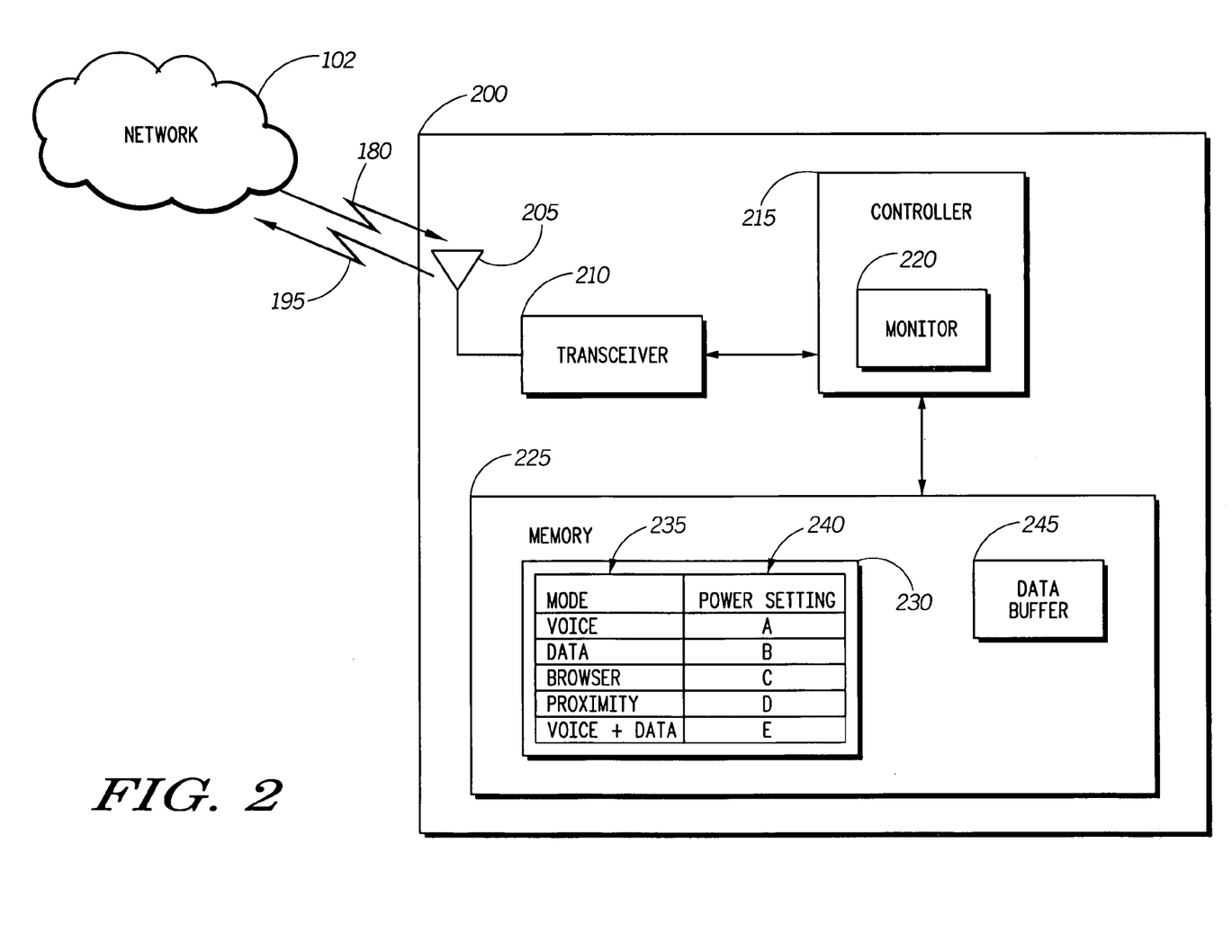
FIG. 2 is an electronic block diagram illustrating a portable communication device.

FIG. 2 is an electronic block diagram illustrating a portable communication device 200 in accordance with the present invention. The portable communication device 200, for example, can operate within a communication system such as the wireless communication system 100 of FIG. 1. The portable communication device 200, by way of example only, can be embodied in a cellular radiotelephone having a conventional cellular radio transceiver circuitry, as is known in the art, and will not be presented here for simplicity. The invention is alternatively applied to other portable communication devices such as, for example, messaging devices, personal digital assistants and personal computers with communication capability, mobile radio handsets, cordless radiotelephone and the like.

The portable communication device 200 includes conventional device hardware (also not represented for simplicity) such as user interfaces, alert circuits, displays, and the like, that are integrated in a compact housing. Each particular communication device will offer opportunities for implementing the present invention.

As illustrated in FIG. 2, the portable communication device 200 includes an antenna 205, a transceiver 210, a controller 215, and a memory 225. The antenna 205 intercepts transmitted signals from one or more networks and transmits signals to the one or more networks. For example, the antenna 205 can receive the downlink transmission 155 transmitted on the communication downlink 180 (see FIG. 1). The antenna 205 further can transmit the uplink transmission 185 on the communication uplink 195 (see FIG. 1). The antenna 205 operates at various transmit power levels dependent upon the operation of the portable communication device 200.

The antenna 205 is coupled to the transceiver 210, which employs conventional demodulation techniques for receiving the communication signals. The transceiver 210 is coupled to the controller 215 and is responsive to commands from the controller 215. When the transceiver 210 receives a command from the controller 215, the transceiver 210 sends a signal via the antenna 205 to one or more of the communication systems. The transceiver 210 further establishes the transmit power for which the antenna 205 operates in one or more operation modes. In an alternative embodiment (not shown), the portable communication device 200 includes a receive antenna and a receiver for receiving signals from one or more of the communication systems and a transmit antenna and a transmitter for transmitting signals to one or more of the communication systems. It will be appreciated by one of ordinary skill in the art that other similar electronic block diagrams of the same or alternate type can be utilized for the portable communication device 200.

Coupled to the transceiver 210, is the controller 215 utilizing conventional signal-processing techniques for processing received messages. It will be appreciated by one of ordinary skill in the art that additional controllers can be utilized as required to handle the processing requirements of the controller 215. The controller 215 decodes an identification in the demodulated data of a received data message, compares the decoded identification with one or more identifications stored in the memory 225, and when a match is detected, proceeds to process the remaining portion of the received data message. The one or more identifications, for example, can be a unique selective call address assigned within a wireless communication system, an electronic mail address, an IP (internet protocol) address or any other similar identification. Further, the controller 215 processes voice communications upon receipt from the network 102 and processes voice communications for transmission to the network 102.

In accordance with the present invention, the controller 215 includes a monitor 220 for monitoring one or more communication uplinks and associated uplink allocations such as time slot allocations, code allocations, and coding rate allocations. The monitor 220 can further monitor radiated and/or reflected power, antenna tuning (SWR), battery loading (R-source), and the like. The monitor 220 can further monitor one or more operating parameters such as, but not limited to, a thermal parameter and a power parameter associated with the portable communication device 200. For example, the monitor 220 may monitor the temperature of the transceiver 210 to determine whether the temperature exceeds a threshold. The threshold may be associated with a condition suggesting overheating of a component (e.g., the transceiver 210). It will be appreciated by those of ordinary skill in the art that the monitor 220 can be hard coded or programmed into the portable communication device 200 during manufacturing, can be programmed over-the-air upon customer subscription, or can be a downloadable application. It will be appreciated that other programming methods can be utilized for programming the monitor 220 into the portable communication device 200. It will be further appreciated by one of ordinary skill in the art that the monitor 220 can be hardware circuitry within the portable communication device 200. In accordance with the present invention, the monitor 220 can be contained within the controller 215 as illustrated, or alternatively can be an individual monitor block operatively coupled to the controller 215 (not shown).

To perform the necessary functions of the portable communication device 200, the controller 215 is operatively coupled to the memory 225, which can include a random access memory (RAM), a read-only memory (ROM), an electrically erasable programmable read-only memory (EEPROM), and flash memory. The memory 225, for example, includes memory locations for the storage of one or more received or transmitted messages, one or more software applications, one or more image data, and the like. It will be appreciated by those of ordinary skill in the art that the memory 225 can be integrated within the portable communication device 200, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the portable communication device 200. The SIM card can be used to transfer a variety of information from/to the portable communication device 200 and/or any other compatible device.

In accordance with the present invention, a plurality of modes 235 and an associated plurality of power settings 240 are stored in a mode vs. power settings 230 memory location in the memory 225. The mode vs. power settings 230 provides the capability for the portable communication device 200 to utilize different resources for different environments and applications. For example, when web-browsing, the portable communication device 200 may need to operate at a lower power level so that a faster data rate (i.e., more timeslots or codes) may be available to transmit data to the communication system. Similarly, proximity to active base stations can require different resource utilization. When the portable communication device 200 is farther away from a base station (i.e. the RF transmitter 135 of FIG. 1), higher output power from the antenna 205 may be necessary to communicate with the base station. In contrast, the portable communication device 200 may operate at a faster data rate (i.e., more timeslots or codes) when closer to the base station.

The memory 225 further includes a data buffer 245 for storage of data to be transmitted to one or more communication systems. The data buffer 245, for example, can be a part of the memory 225 used for temporary storage of data that is waiting to be transmitted by the portable communication device 200; used to compensate for differences in the rate of flow of data between the portable communication device 200 and the network 102.

Figure 3:
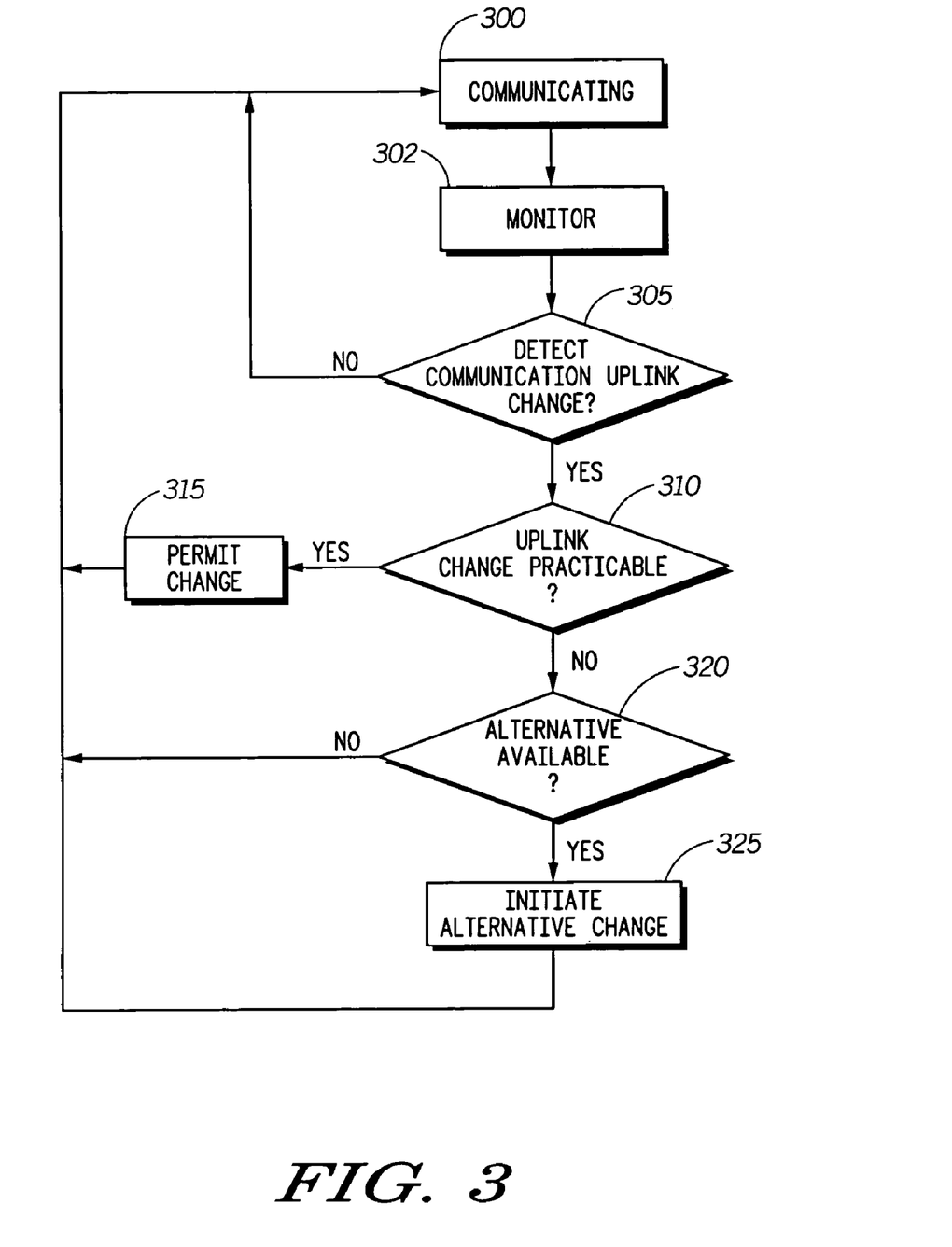
FIGS. 3 through 5 are flowcharts illustrating various embodiments of the operation of the portable communication device of FIG. 2.

FIG. 3 is a flowchart illustrating one embodiment of the operation of the portable communication device 200 of FIG. 2 in accordance with the present invention. The operation of FIG. 3 begins with Step 300 in which the portable communication device 200 is communicating within a network. Next, in Step 302, the portable communication device 200 (i.e. the monitor 220) monitors the uplink performance. The step of monitoring can, for example, include determining whether the portable communication device 200 is in a data mode, a voice mode, or a data and voice mode. Similarly, the step of monitoring can include monitoring data throughput capacity. The step of monitoring can further include detecting proximity to a near-field mass. The step of monitoring further can include detecting availability of memory space in the memory 225 for the data being stored in the data buffer 245. The step of monitoring further can include monitoring one or more operating parameters within the portable communication device 200.

Next, in Step 305, the portable communication device 200 detects a communication uplink change. The communication uplink change, for example, can be an uplink allocation increase or decrease event. The uplink allocation increase or decrease event can include an event (such as a request from the network 102) to increase or decrease in time slots to change the data throughput capacity when the network 102 is a packet data system such as a TDMA, GPRS, EGPRS system or the like. Similarly, the uplink allocation increase or decrease event can include an event (such as a request from the network 102) to increase or decrease the number of channel codes to vary the data throughput capacity when the network 102 is a CDMA system or the like. Alternatively, the communication uplink change, for example, can be a power increase or decrease event. When no communication uplink change is detected in Step 305, the operation cycles back to Step 300 in which the portable communication device 200 continues to communicate within the network.

When a communication uplink change is detected in Step 305, the operation continues with Step 310 in which the portable communication device 200 determines whether the communication uplink change is practicable. In other words, the portable communication device determines whether the communication uplink change is capable of being effected, done, put into practice, or feasible. Determining whether the communication uplink change is practicable, for example, can include determining whether the change will cause the communication uplink to exceed the uplink resource limit. As an example, permitting a change to a higher data throughput capacity may be practicable when the portable communication device 200 is operating in a data only mode, but not practicable when the portable communication device is in a voice mode, or a data and voice mode. As another example, permitting a change which limits the data capacity may not be practicable when proximity to a significant near field mass, such as a large and/or dense mass in the near field of antenna 205 is determined; while it may be practicable when the portable communication device is not in proximity to such near field mass.

When the communication uplink change is practicable in Step 310, the operation continues with Step 315 in which the portable communication device 200 permits the communication uplink change. Next, the operation cycles back to Step 300 in which the portable communication device 200 continues to communicate within the network with the communication uplink change implemented.

When the communication uplink change is not practicable in Step 310, the operation continues with Step 320 in which the portable communication device determines whether an alternative is available. The step of evaluating alternatives can include evaluating alternatives to increasing data throughput or evaluating alternatives to increasing power. For example, an alternative can include reducing one resource and increasing another resource. Another alternative can include decreasing the transmit power and increasing data throughput. Alternatives to increasing transmit power can, for example, include making no change; requesting handoff to another link; and reducing data throughput.

Similarly, an alternative to increasing data throughput can include making no change and requesting hand-off to another communication link.

When no alternatives are available in Step 320, the operation cycles back to Step 300 and the portable communication device 200 continues to communicate without any changes being made. Ibis communication can continue indefinitely until the issue that caused the need for a change causes a quality of service loss such as until the communication drops off or the data in the data buffer overflows. When an alternative is available in Step 320, the operation continues to Step 325 in which the portable communication device 200 initiates the alternative change. Initiating the change can include sending a request to the network for the alternative change and awaiting confirmation from the network; or alternatively implementing the alternative change and informing the network of the implementation. The operation then cycles back to Step 300 in which the portable communication device 200 continues to communicate within the network with the communication uplink change implemented.

Figure 4:
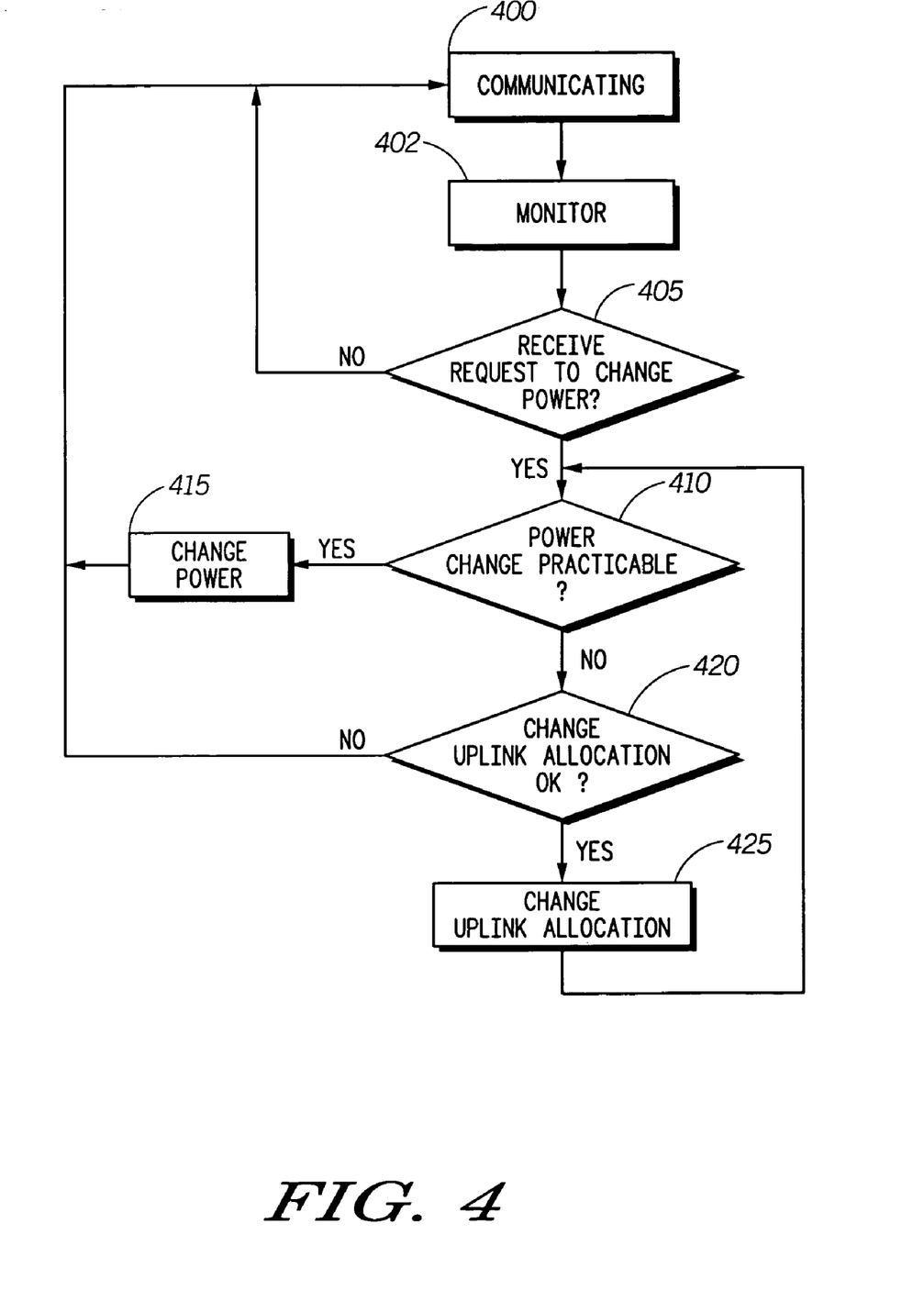

FIG. 4 is a flowchart illustrating one embodiment of the operation of the portable communication device 200 of FIG. 2 in accordance with the present invention. Specifically, FIG. 4 illustrates the operation of the portable communication device 200 of FIG. 2 including a response to receiving a request from the wireless communication system 100 to change its transmit power level.

The operation of FIG. 4 begins with Step 400 in which the portable communication device 200 is communicating within a network. Next, in Step 402, the portable communication device 200 (i.e. the monitor 220) monitors the uplink performance. The step of monitoring can, for example, include determining whether the portable communication device 200 is in a data mode, a voice mode, or a data and voice mode. Similarly, the step of monitoring can include monitoring data throughput capacity, time slot allocations, code allocations, or coding rate. The step of monitoring can further include detecting proximity to a near-field mass. The step of monitoring further can include detecting availability of memory space in the memory 225 for the data being stored in the data buffer 245.

Next, in Step 405, the portable communication device 200 determines whether it has received a request to change transmit power from the network 102. For example, the network 102 can request that the portable communication device 200 increase its transmit power. For example, the network 102 may adjusts the power level of the portable communication device 200 to regulate the signal level arriving at a base station controlled by the network. In some circumstances, the network 102 may determine that the portable communication device 200 needs to operate at a higher power for better quality of service. For example, when the portable communication device 200 is farther away from a base station (i.e. the RF transmitter 135 of FIG. 1), higher output power from the portable communication device 200 may be necessary to communicate with the base station. The request to change power can alternatively be a request/suggestion to lower power such as when the portable communication device 200 is closer to a base station.

When no request to change transmit power has been received from the network 102 in Step 405, the operation cycles back to Step 400 and the portable communication device 200 continues to communicate within the network 102. When a request to change transmit power has been received from the network 102 in Step 405, the operation continues to Step 410 in which the portable communication device 200 determines whether the power change is practicable. For example, when the network 102 requests an increase in transmit power in Step 405, the portable communication device 200 determines in Step 410 whether the increased power is available. The portable communication device 200, for example, may compare the requested increase power level with the associated power setting for the current operation mode as stored in the mode vs. power settings 230 in the memory 225. In a data application such as web-browsing, for example, the portable communication device 200 may need to operate at a lower power level so that a faster data rate (i.e., more timeslots) may be available to transmit data to the network. Otherwise, the transceiver circuitry within the portable communication device 200 may overheat by operating at a maximum power level and a maximum data rate. When the power change is practicable in Step 410, the operation continues with Step 415 in which the transmit power is changed. For example, the transmit power is increased when an increase is requested and practicable. The operation then cycles back to Step 400 in which the portable communication device 200 communicates within the network using the change transmit power.

When the power change is not practicable in Step 410, the operation continues with Step 420 in which the portable communication device 200 determines whether one or more uplink allocations can be changed. For example, in a packet data system, it may be feasible to reduce the number of slots to provide for the required increase in the power level to be practicable. Similarly, in a CDMA system, it may be feasible to reduce the number of codes to provide for the required increase in the power level to be practicable. Similarly, it may be feasible to change the coding rate as an alternative to changing the power level. For example, a lower coding rate (more parity bits for error correction) would allow for maintaining the communication link without increasing power. Changing the modulation scheme or data rate would also accomplish the same result. It will be appreciated by those of ordinary skill in the art that determining the feasibility of an uplink allocation change will typically include the portable communication device 200 sending a request to the network 102 with the requested uplink allocation change, the network 102 determining whether the uplink allocation change is available/suitable, and the network 102 sending an acknowledgement to the portable communication device 200. (not shown) Other similar methods of determining the feasibility of the uplink allocation change are within the scope of the present invention.

When an uplink allocation change is not feasible in Step 420, the operation cycles back to Step 400 in which the portable communication device 200 continues to communicate on the network using the current settings. This communication can continue indefinitely until the issue that caused the need for a change causes a quality of service loss such as until the communication drops off or the data in the data buffer overflows.

When an uplink allocation change is feasible in Step 420, the operation continues with Step 425 in which the portable communication device 200 changes the uplink allocation. Initiating the uplink allocation change can include sending a request to the network for the changed uplink allocation and awaiting confirmation from the network; or alternatively implementing the change to the uplink allocation and informing the network of the implementation. The operation then cycles back to Step 410 in which the portable communication device 200 determines whether the power change is now practicable using the changed uplink allocation.

In an alternate embodiment of the present invention (not shown), the operation of Step 420 comprises the portable communication device 200 identifying an uplink allocation that it knows would allow for the requested power change. In this embodiment, after Step 425 in which the portable communication device 200 changes the uplink allocation, the operation cycles back to Step 415 in which the power change is made.

Figure 5:
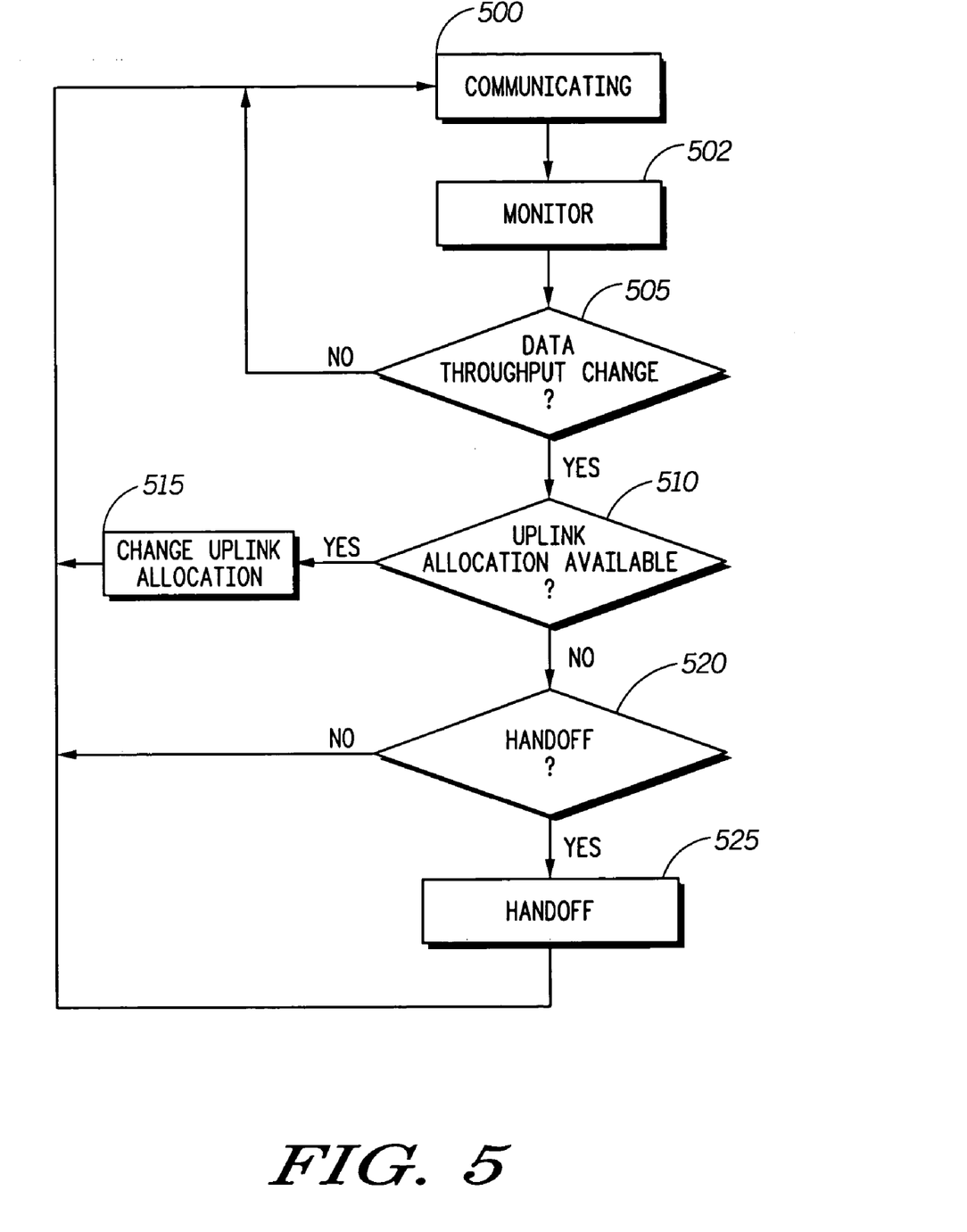

FIG. 5 is a flowchart illustrating one embodiment of the operation of the portable communication device 200 of FIG. 2 in accordance with the present invention. Specifically, FIG. 5 illustrates the operation of the portable communication device 200 of FIG. 2 including a response to detecting a need to change its data throughput.

The operation of FIG. 5 begins with Step 500 in which the portable communication device 200 is communicating within a network. Next, in Step 502, the portable communication device 200 (i.e. the monitor 220) monitors the uplink performance. The step of monitoring can, for example, include determining whether the portable communication device 200 is in a data mode, a voice mode, or a data and voice mode. Similarly, the step of monitoring can include monitoring data throughput capacity, time slot allocations, code allocations, or coding rate. The step of monitoring can further include detecting proximity to a near-field mass. The step of monitoring further can include detecting availability of memory space in the memory 225 for the data being stored in the data buffer 245.

Next, in Step 505, the portable communication device 200 determines whether a data throughput change is required. For example, the data buffer 245 may be filling up, thereby causing the portable communication device 200 to need to send data faster. In a packet data system such as a TDMA system, for example, the portable communication device 200 may need more timeslots allocated to it to clear out the data buffer 245. In a CDMA system, for example, the portable communication device 200 may need more codes allocated to it to clear out the data buffer 245. As another example, the portable communication device 200 may switch from a voice application (e.g., a voice call) to a data application (e.g., web-browsing), which may require a faster data rate and thus a change in its uplink allocation. Alternatively, it may be desirable to decrease one or more uplink allocations for efficiency in response to a transmit power increase. Similarly, it may be desirable to increase one or more uplink allocations in response to a transmit power decrease. When no data throughput change is required and/or desired in Step 505, the operation cycles back to Step 500 and the portable communication device 200 continues communicating within the network 102.

When a data throughput change is required and/or desired in Step 505, the operation continues with Step 510 in which the portable communication device 200 determines whether the uplink allocation to change the data throughput is available. For example, the portable communication device 200 determines whether more timeslots or more codes are available for its use dependent upon the type of network. This determination can include requesting the change from the network and awaiting confirmation; or alternatively can include making the change based on information obtained in the monitor Step 502. When the uplink allocation is available in Step 510, the operation continues with Step 515 in which the uplink allocation is changed. The operation then cycles back to Step 500 in which the portable communication device 200 communicates using the changed uplink allocation within the network 102.

When the uplink allocation is not available in Step 510, the portable communication device 200 can determine whether a handoff to another base station, or alternatively another network, is possible in Step 520. When a handoff is not available in Step 520, the operation cycles back to Step 500 in which the portable communication device 200 continues to communicate on the network using the current settings. This communication can continue indefinitely until the issue that caused the need for a change causes a quality of service loss such as until the communication drops off or the data in the data buffer overflows. When a handoff is available in Step 520, the portable communication device 200 initiates the handoff in Step 525. Initiating the handoff can include sending a request to the network for the handoff and awaiting confirmation from the network(s). The operation then cycles back to Step 500 in which the portable communication device 200 continues to communicate within the new network/base station.

Figure 6:
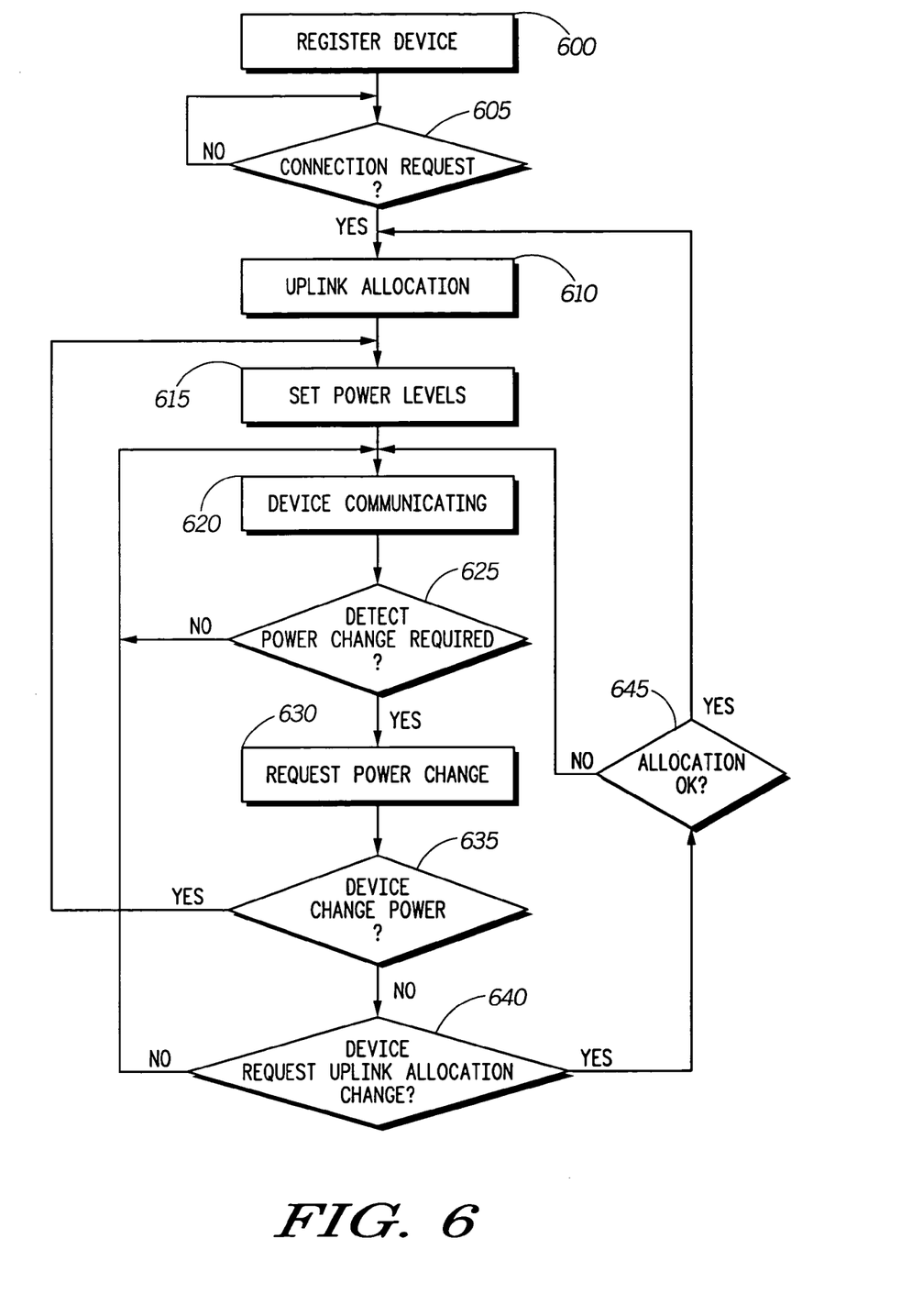
FIGS. 6 and 7 are flowcharts illustrating various embodiments of the operation of a network for use within the wireless communication system of FIG. 1.

FIG. 6 is a flowchart illustrating one embodiment of the operation of the network 102 in accordance with the present invention. Specifically, FIG. 6 illustrates the operation of the network 102 including receiving a request for a transmit power change from a portable communication device.

The operation of FIG. 6 begins with Step 600 in which the network 102 registers the portable communication device 200. This registration can, for example, be in response to a request from the portable communication device 200 to register on the network 102. The registration of the portable communication device 200 can include setting limits on maximum transmit power and data rates (i.e. maximum slots or maximum codes depending upon the network) and communicating these limits between the network 102 and the portable communication device 200. Further, the registration can include registering a power class designation with the network when the portable communication device 200 is turned on (i.e., via a registration for communication services). Next, in Step 605, the network 102 determines whether a connection request has been received from the portable communication device 200. The connection request can be a data connection, a data and voice connection, and the like. When no connection request has been received in Step 605, the operation continues to periodically check for such a request.

When a connection request has been received in Step 605, the operation continues with Step 610 in which the network 102 allocates uplink resources to the portable communication device 200 including data rates and the like. Next, in Step 615, the network 102 sets the power levels for the portable communication device 200. Accordingly, the network 102 may assign communication resources to the portable communication device 150 based on the multi-slot based power class designation. Steps 610 and 615, for example can be accomplished by the network 102 transmitting an assignment message including information associated with communication resources available for the portable communication device 200 to establish a communication link. For example, the assignment message may include an assigned power level and an assigned number of slots or codes available for the portable communication device 200.

Next, in Step 620, the connection is established and the portable communication device 200 communicates within the network 102. Next, in Step 625, the network 102 periodically checks for detection of a required power change. For example, the network 102 may detect that the transmit power of the portable communication device 200 is too low by evaluating signal strength and bit error rate.

When no power change requirement is detected in Step 625, the operation cycles back to Step 620 and the portable communication device 200 continues communicating within the network 102. When a power change requirement is detected in Step 625, the operation continues with Step 630 in which the network 102 sends a request to change the transmit power level to the portable communication device 200. For example, the network 102 can request the portable communication device 200 increase its transmit power level. Next, in Step 635, the network 102 determines whether the portable communication device 200 has changed its power level. When the portable communication device 200 changes its transmit power in Step 635, the operation cycles back to Step 620 in which the portable communication device 200 continues communicating on the network 102 using the new power level.

When the network 102 does not determine a change in power level from the portable communication device 200 in Step 635, the operation continues with Step 640 in which the network 102 determines whether a request for an uplink allocation change has been received from the portable communication device 200. When no request has been received in Step 640, the operation cycles back to Step 620 in which the portable communication device 200 continues communicating on the network without any changes. When a request has been received in Step 640, the network 102 determines whether the requested uplink allocation change is practicable in Step 645. When the allocation is not practicable in Step 645, the operation cycles back to Step 620 in which the portable communication device 200 continues communicating within the network 102 without any change. The network 102 further can send a rejection of the request to the portable communication device 200 (not shown). When the requested allocation is practicable in Step 645, the operation cycles back to Step 610 in which the network 102 changes the uplink allocation for the portable communication device 200.

Figure 7:
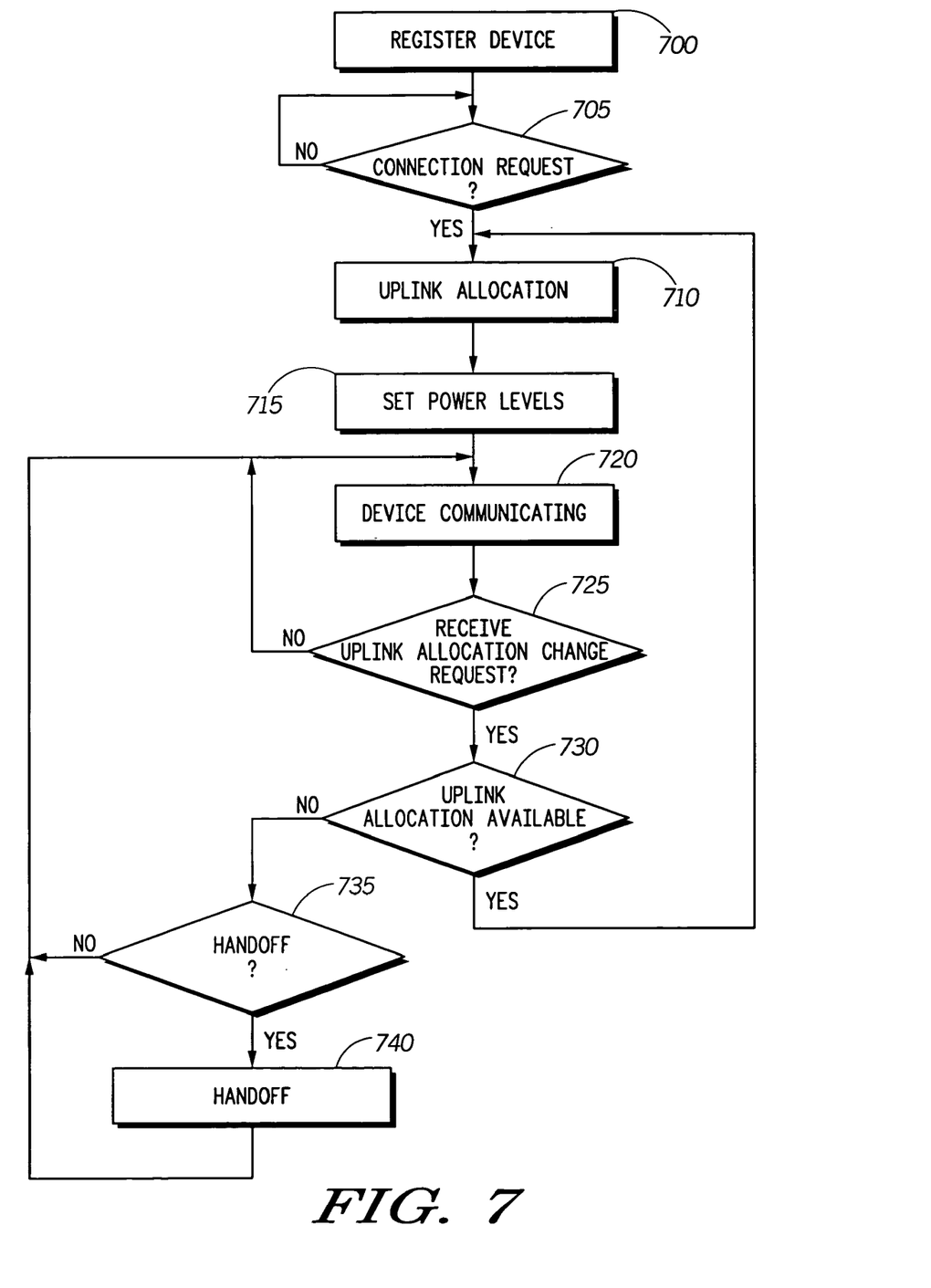

FIG. 7 is a flowchart illustrating one embodiment of the operation of the network 102 in accordance with the present invention. Specifically, FIG. 7 illustrates the operation of the network 102 including receiving a request for an uplink allocation change from a portable communication device.

The operation of FIG. 7 begins with Step 700 in which the network 102 registers the portable communication device 200. This registration can, for example, be in response to a request from the portable communication device 200 to register on the network 102. The registration of the portable communication device 200 can include setting limits on maximum transmit power and data rates (i.e. maximum slots or maximum codes depending upon the network) and communicating these limits to the portable communication device 200. Next, in Step 705, the network 102 determines whether a connection request has been received from the portable communication device 200. The connection request can be a data connection, a data and voice connection, and the like. When no connection request has been received in Step 605, the operation continues to periodically check for such a request.

When a connection request has been received in Step 705, the operation continues with Step 710 in which the network 102 allocates uplink resources to the portable communication device 200 including data rates and the like. Next, in Step 715, the network 102 sets the power levels for the portable communication device 200. Next, in Step 720, the connection is established and the portable communication device 200 communicates within the network 102. Next, in Step 725, the network 102 periodically checks for receipt of an uplink allocation change request from the portable communication device 200. For example, the portable communication device 200 may switch from a voice application (e.g., a voice call) to a data application (e.g., web-browsing), which may require a faster data rate and thus a change in its uplink allocation. When no request is detected in Step 725, the operation cycles back to Step 720 and the portable communication device 200 continues communicating within the network 102. When a request for an uplink allocation change is detected in Step 725, the operation continues with Step 730 in which the network 102 determines whether the requested uplink allocation is available When the request uplink allocation is available, the operation cycles back to Step 710 in which the network 102 changes the uplink allocation for the portable communication device 200.

When the uplink allocation change request is not practicable in Step 730, the operation continues with Step 735 in which the network 102 initiates a hand-off procedure to determine whether a handoff to another base station or another network will result in better performance. When it is determined that a handoff is not available to support better performance in Step 735, the operation cycles back to Step 720 in which the portable communication device 200 continues communicating within the network 102 with no changes. When a handoff is available to support better performance, the operation continues with Step 740 in which the handoff is accomplished. The operation then cycles back to Step 720 in which the portable communication device 200 communicates within the new network or with the new base station.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of operating a portable communication device, comprising the steps of:
   detecting a communication uplink change;
   determining whether said communication uplink change is practicable including detecting whether said communication uplink change will cause an uplink resource limit to be exceeded; and
   permitting said communication uplink change when said communication uplink change is determined by the portable communication device to be practicable.

2. The method according to claim 1, further including the step of evaluating alternatives when said uplink change event is not practicable.

3. The method according to claim 1, wherein said step of detecting a communication uplink change includes detecting an uplink allocation change event.

4. The method according to claim 3, wherein said step of detecting an uplink allocation change event includes detecting an event requesting a time slot characteristic change.

5. The method according to claim 3, wherein said step of detecting an uplink allocation change event includes detecting an event requesting a change in the number of channel codes.

6. The method according to claim 3, wherein said step of detecting an uplink allocation change event includes detecting a power change request.

7. A method of operating a portable communication device, comprising the steps of:
   monitoring uplink performance including determining whether the portable communication device is in a data mode, a voice mode, or a data and voice mode;
   detecting a communication uplink change;
   determining whether said communication uplink change is practicable; and
   permitting said communication uplink change when said communication uplink change is determined by the portable communication device to be practicable, wherein said step of permitting said uplink communication change includes permitting a higher data throughput capacity in a data only mode.

8. The method according to claim 7, wherein said step of monitoring includes monitoring data throughput capacity.

9. A method of operating a portable communication device, comprising the steps of:
   detecting a communication uplink change;
   determining whether said communication uplink change is practicable;
   permitting said communication uplink change when said communication uplink change is determined by the portable communication device to be practicable;
   detecting a near-field mass; and limiting data throughput when detecting proximity to the near-field mass.

10. A method of operating a portable communication device, comprising the steps of:
    detecting a communication uplink change;
    determining whether said communication uplink change is practicable;
    permitting said communication uplink change when said communication uplink change is determined by the portable communication device to be practicable; and
    evaluating alternatives when said uplink change event is not practicable including evaluating feasibility of decreasing power and increasing data throughput capacity.

11. A method of operating a portable communication device, comprising the steps of:
    detecting a communication uplink change;
    determining whether said communication uplink change is practicable;
    permitting said communication uplink change when said communication uplink change is determined by the portable communication device to be practicable; and
    evaluating alternatives when said uplink change event is not practicable including evaluating feasibility of decreasing data throughput capacity and increasing power.

12. A method of operating a portable communication device, comprising the steps of:
    detecting a communication uplink change;
    determining whether said communication uplink change is practicable;

permitting said communication uplink change when said communication uplink change is determined by the portable communication device to be practicable; and evaluating alternatives when said uplink change event is not practicable including evaluating as alternatives to increasing power making no change; requesting hand-off to another link; and reducing data throughput capacity.

13. A method of operating a portable communication device, comprising the steps of:

detecting a communication uplink change;

determining whether said communication uplink change is practicable;

permitting said communication uplink change when said communication uplink change is determined by the portable communication device to be practicable; and evaluating alternatives when said uplink change event is not practicable including evaluating as alternatives to increasing data throughput capacity making no change and requesting hand-off to a better communication link.

14. A portable communication device comprising:

a transceiver; and a controller coupled to said transceiver, said controller operable to respond to a channel uplink change event to determine whether an uplink change resulting from said channel uplink change event is practicable, and to permit said uplink change if said uplink change is practicable, and to evaluate alternatives wherein said controller is further operable to receive a power change request, and is responsive to said power change request to request a change in data throughput if said power change request exceeds a setting limit.

15. The portable communication device as defined in claim 14, wherein said controller is operable to request an increase in an uplink allocation.

16. The portable communication device as defined in claim 14, further including a link monitor.

17. A method of operating a network to communicate with at least one portable communication device, the method comprising the steps of:

determining that a portable communication device requires a power change;

transmitting to the portable communication device a power change request;

receiving from the portable communication device a response to said power change request comprising an uplink allocation change; and transmitting an updated uplink channel allocation when available, including terminating a data resource to support a voice only mode.

18. The method as defined in claim 17, further including the step of retransmitting a power change request upon transmitting said updated uplink channel allocation.

19. The method as defined in claim 17, further including the step of participating in a hand-off procedure to a better communication link when a decrease in channel allocation is required to support a higher uplink transmit power.

* * * * *